(12) United States Patent
Yamauchi et al.

(10) Patent No.: US 6,717,702 B1
(45) Date of Patent: Apr. 6, 2004

(54) IMAGE READING APPARATUS

(75) Inventors: Tsuyoshi Yamauchi, Kawasaki (JP); Hirotoshi Kishi, Tokyo (JP); Shigeru Kawasaki, Yokohama (JP); Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 09/650,995

(22) Filed: Aug. 31, 2000

(30) Foreign Application Priority Data

Sep. 6, 1999 (JP) .......................................... 11-252021

(51) Int. Cl.⁷ ................................................ H04N 1/04
(52) U.S. Cl. ........................ 358/497; 358/483; 358/474; 358/471
(58) Field of Search ................................ 358/497, 474, 358/494, 471, 400, 296, 483, 505, 506, 514, 512, 513, 487, 482; 318/685, 696; 250/208.1, 234–236; 382/312, 318, 319

(56) References Cited

U.S. PATENT DOCUMENTS

| | | | |
|---|---|---|---|
| 5,936,223 A | 8/1999 | Suzuki et al. | 235/462.01 |
| 6,246,492 B1 * | 6/2001 | Chang et al. | 358/497 |
| 6,330,084 B1 * | 12/2001 | Chiang | 358/497 |
| 6,335,802 B1 * | 1/2002 | Hung-Che et al. | 358/471 |

OTHER PUBLICATIONS

Huang, "Carrier Mechanism For Supporting And Moving Traveling module", U.S. patent application Publication No. US2002/0117546A1, Aug. 29, 2002.*

Lan, "Guide Screw Rod For A Scanner". U.S. patent application Publication No. US2002/0001106A1, Jan. 23, 2002.*

U.S. patent application Ser. No. 09/650,993, filed Aug. 31, 2000.

U.S. patent application Ser. No. 09/498,630, filed Feb. 7, 2000.

* cited by examiner

Primary Examiner—Cheukfan Lee
(74) Attorney, Agent, or Firm—Fitzpatrick, Cella, Harper & Scinto

(57) ABSTRACT

An image reading apparatus comprises a scanning member movable along an original mounting table, the scanning member having a reading element for reading the image of an original, and a drive source for moving the scanning member, a frame containing the scanning member therein, and a cable for electrically connecting the scanning member and the frame side together, the cable having a first electrical signal path connected to the reading element, and a second electrical signal path connected to the drive source.

8 Claims, 5 Drawing Sheets

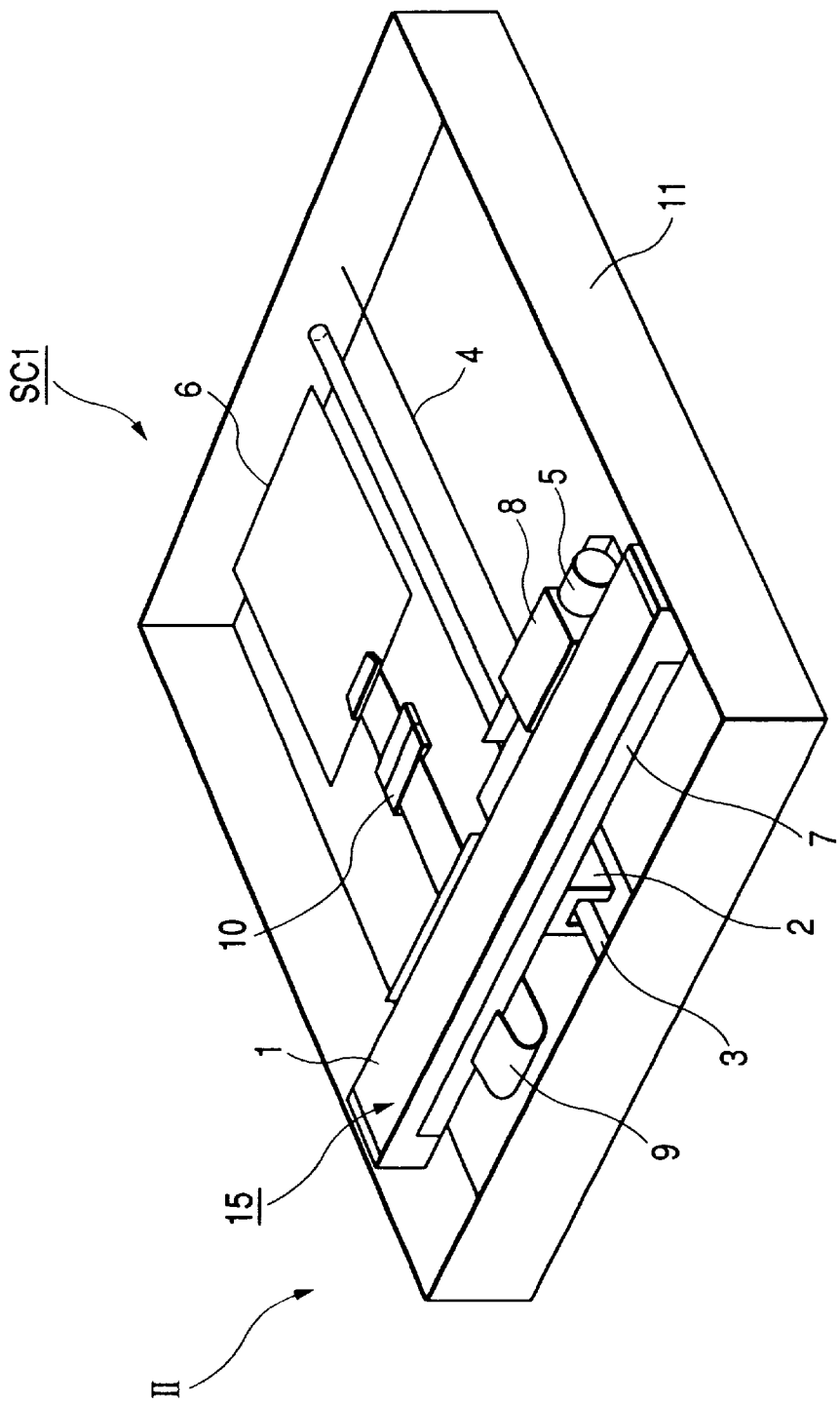

IMAGE READING APPARATUS

BACKGROUND OF THE INVENTION

1. Field of the Invention

This invention relates to an image reading apparatus for reading originals such as documents and photographs, and particularly to an image reading apparatus suitable, for example, as a scanner for computer input for converting read information into digital data and outputting it to a computer.

2. Related Background Art

Image reading apparatuses of this kind have heretofore been widely used as means for reading image information on an original such as a print or a photograph, and outputting it to a processing apparatus such as a computer.

FIGS. 6 and 7 of the accompanying drawings schematically show an image reading apparatus according to the prior art.

As shown in FIG. 6, the image reading apparatus SC100 is provided with a box-shaped frame 111, an original mounting glass table 100 disposed on the upper surface thereof, and an openable and closable door type original cover 112 disposed on the original mounting glass table 100, as main external appearance portions.

When reading an original, an original P is first placed on the original mounting glass table 100, whereafter the original cover 112 is closed to thereby press the original P on the glass plate. Next, a reading unit (scanning member) 115 (indicated by broken lines) provided in the frame 111 scans parallel to the plane of the glass plate to thereby read an image on the original P.

Also, although not shown, the reading unit 115 has incorporated therein LED's (light emitting diodes) of three colors (red, green and blue) which are light sources for irradiating the original, an image sensor and a rod lens array for imaging the reflected light from the original on the light receiving element of the image sensor. The reading unit 115 changes over the LED's of three colors in succession and turns on them (causes them to emit lights), and makes the image sensor read reflected lights produced from the original correspondingly to these lights, thereby effecting color resolution reading.

FIG. 7 is a plan view of the reading unit 115 contained in the image reading apparatus SC100 and various members concerned in the driving thereof as they are seen from the upper surface side as the internal structure of the apparatus.

As shown in FIG. 7, the frame 111 of the image reading apparatus SC100 has incorporated therein the reading unit 115, driving members such as a slider 102, a guide shaft 103 and a belt 104 for driving the reading unit, and an electrical portion 106 comprising a control board, a power source, etc.

The reading unit 115 is fixedly supported on the slider 102 sliding on the guide shaft 103 fixed to the main body of the apparatus SC100. Also, the belt 104 for transmitting motive power from a motor 105 which is a scanning drive source is fixed to the slider 102 or the unit 115. By the forward and reverse rotations of the motor 105, the scanning unit 115 is reciprocally moved in the glass plane area of the original supporting glass plate 100 (see FIG. 6) along the axis of the guide shaft 102. Thus, the image on the original P is read.

Now, as is apparent from the foregoing description, in the image reading apparatus according to the prior art, the drive source for moving the reading unit (scanning member) is provided at a predetermined location (in the above-described example of the prior art, the bottom) in the main body of the image reading apparatus, discretely from the scanning member.

Therefore, it has been necessary that a space for disposing the drive source therein should be secured somewhere in the main body of the apparatus except the movement area of the image sensor. Moreover, it also becomes necessary to dispose the driving members such as the belt, etc. from the drive source and therefore, the downsizing of the apparatus has naturally been limited.

Against such a problem, it has also been conceived to achieve the downsizing of the apparatus by adopting a construction in which the drive source (the motor or the like) for the scanning member is contained in or attached to the scanning member to thereby move the scanning member by its own ability without the intermediary of an extraneous driving motor or a motive power transmitting mechanism.

Now, if the drive source is provided in the scanning member, different machine parts such as the reading unit including the image sensor and the drive source are provided in the scanning member. Thereupon the connection between electrical signal paths necessary for the driving and control of the two becomes necessary and therefore, the number of the electrical signal paths is increased to thereby complicate the wiring. Further, to accomplish highly accurate image reading, it is indispensable for the operation of the scanning member to be effected with high accuracy. With regard also to this point, the addition of the drive source increases the number of the parts of the scanning member and in addition, it is undeniable that the complication of the wiring of the electrical signal paths would become disadvantageous for the reliability of the scanning operation of the scanning member.

SUMMARY OF THE INVENTION

The present invention has been made in view of the above-noted problems, and an object thereof is to provide an image reading apparatus in which the movement of a scanning member can be effected smoothly.

Another object of the present invention is to provide an image reading apparatus of simple construction.

Still another object of the present invention is to provide an image reading apparatus comprising:

a scanning member movable along an original mounting table, the scanning member having a reading element for reading the image of an original, and a drive source for moving the scanning member;

a frame containing the scanning member therein; and a cable for electrically connecting the scanning member and the frame side together, the cable having a first electrical signal path connected to the reading element, and a second electrical signal path connected to the drive source.

Further objects of the present invention will become apparent from the following detailed description with reference to the accompanying drawings.

BRIEF DESCRIPTION OF THE DRAWINGS

FIG. 1 is a perspective view schematically showing the internal structure of an embodiment of the image reading apparatus of the present invention.

DESCRIPTION OF THE PREFERRED EMBODIMENTS

The invention will hereinafter be described with reference to the drawings. FIGS. 1 to 5 show an embodiment of the image reading apparatus of the present invention.

Figure 6:
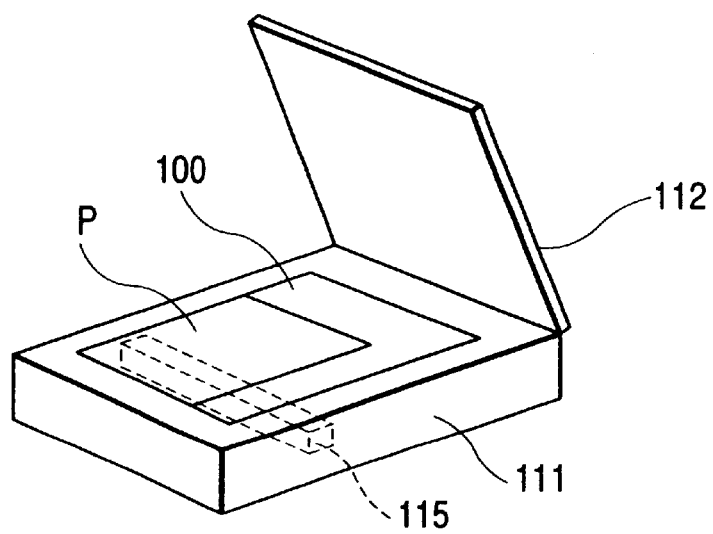
FIG. 6 is a perspective view schematically showing the construction of an image reading apparatus according to the prior art.
Figure 7:
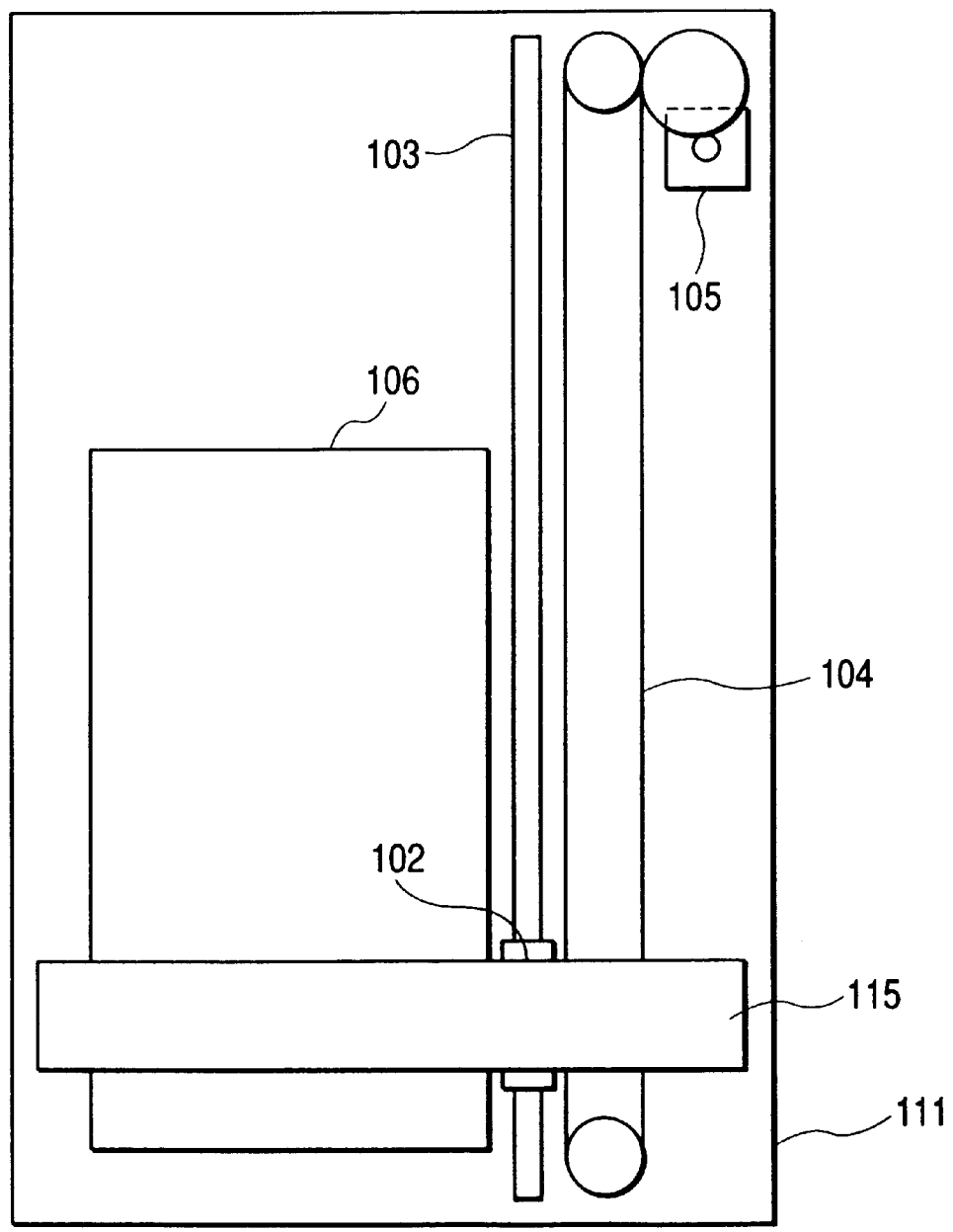
FIG. 7 is a plan view schematically showing the construction of the image reading apparatus according to the prior art.

FIG. 1 is a perspective view schematically showing the internal structure of the image reading apparatus according to the present embodiment, in which upper members such as an original mounting glass table and an original cover are removed therefrom. Incidentally, the main external appearance portions of this image reading apparatus such as the original mounting glass table, the original cover and a frame are substantially the same as those of the image reading apparatus according to the prior art previously described with reference to FIG. 6 and therefore need not be described in detail herein.

The image reading apparatus SC1 has a frame 11 as a box-shaped external cover, and in the frame 11, there are disposed constituent members such as a holder 7 (outer hull member) on which an image sensor unit 1 is placed and fixed, a motor 5 and a transmission 8 juxtaposed with the image sensor unit 1 on the holder 7, a slider 2 provided on the flat bottom of the holder, a bar-like guide shaft 3, a control board 6 and a flat cable 9.

The image sensor unit 1 has incorporated therein an original irradiating light source (not shown), an image sensor (not shown) which is a well-known photoelectric converter for effecting the reading of image information, a lens array (not shown) for imaging the reflected light from an original on the image receiving element of the image sensor. The holder 7 containing the image sensor unit 1 and on which it is placed and fixed is formed of a bottom plate and a part side wall by the edge portion of a flat plate material being partly bent and made into a side plate. Also, besides the image sensor unit 1, a motor which is a drive source and a transmission 8 are juxtaposed on the upper surface of the bottom plate of the holder 7. The slider 2 is mounted on the bottom surface of the holder 7. This slider 2 is a concave member presenting a groove shape, and is slidably supported on the guide shaft 3. The guide shaft 3 has its opposite ends fixed to the frame 11. The image sensor 1, the motor 5, the transmission 8, the holder 7 and the slider 2 together form a scanning member (reading unit) 15, and are made into a construction capable of performing a linear moving operation with the guide shaft 3 as the rack thereof.

Also, the frame 11 contains therein a transmitting mechanism for transmitting the rotative driving force of the motor 5 as the linear motion of the holder 7, i.e., the scanning member 15. A synchromesh wire 4 has one end thereof fixed to the frame 11 and has the other end thereof supported by biasing means fixed to the frame 11, and keeps a predetermined tensile force.

The driving force of the motor 5 is transmitted through the transmission 8 to a well-known synchromesh pulley 14 (see FIG. 2) disposed on the back of the holder 7. The synchromesh pulley 14 is designed to keep synchronous meshing engagement with the synchromesh wire 4.

By the synchromesh pulley 14 being forwardly and reversely rotated in conformity with the forward and reverse rotations of the motor 5 in this manner, the scanning member 15 is reciprocally moved parallel to the original mounting glass table (not shown), i.e., along the axial direction (sub-scanning direction) of the guide shaft 3.

Besides this, the control board 6 disposed on the bottom of the frame 11 inputs and outputs control signals with the image sensor unit 1 and the motor 5, respectively. For this purpose, the control board 6 has connected thereto a flat cable 9 which is the control signal path of the image sensor unit 1 and the motor 5 to transmit these control signals.

Figures 2A, 2B:
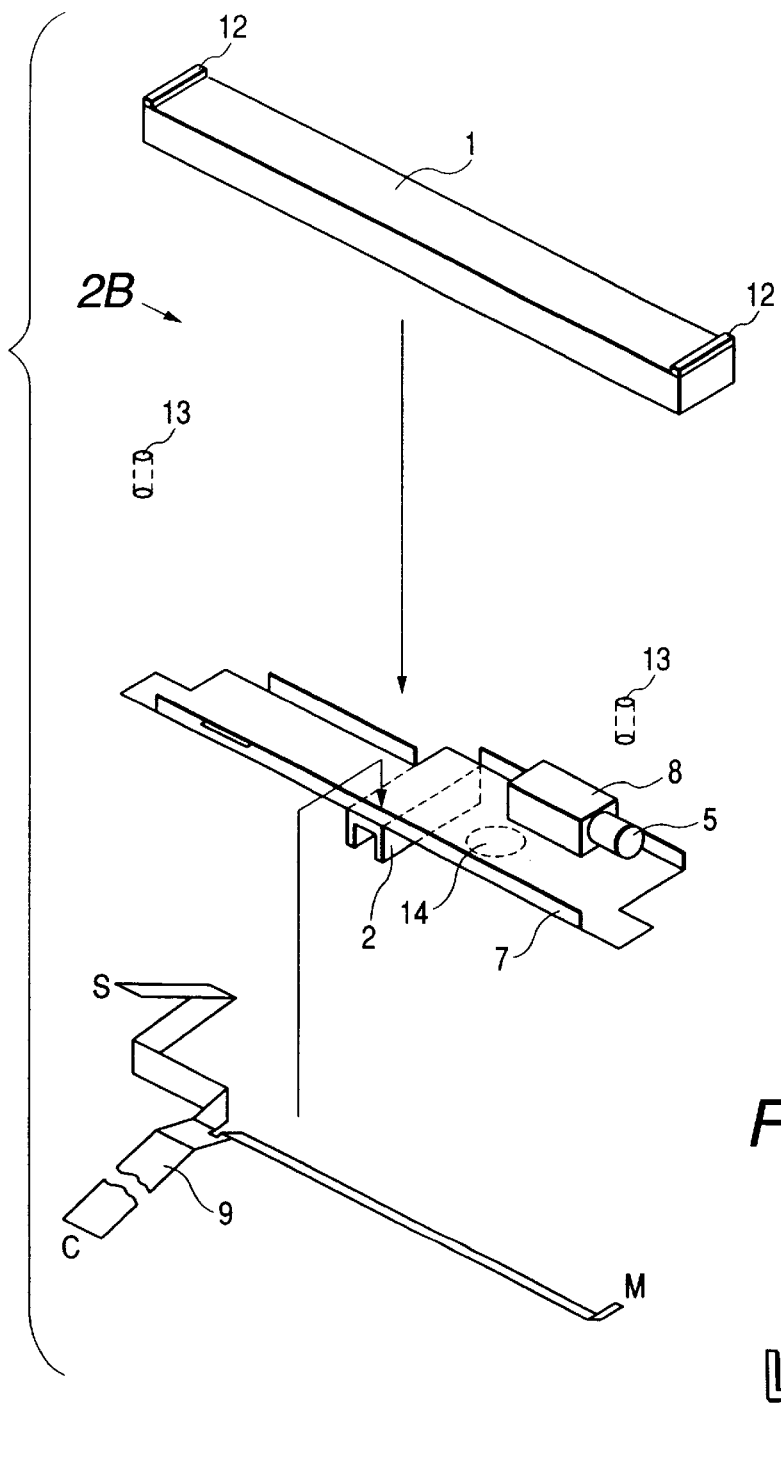
FIGS. 2A and 2B are an exploded perspective view and a side view, respectively, typically showing the structure of a scanning member assembled to the image reading apparatus of FIG. 1.

FIG. 2A is an exploded perspective view typically showing the structure of the scanning member 15 assembled to the image reading apparatus SC1 of the present embodiment, and FIG. 2B is a side view of the scanning member 15 after assembled as it is seen in the direction of arrow 2B in FIG. 2A.

As shown in FIG. 2A, the motor 5, the transmission 8, the synchromesh pulley 14 and the slider 2 are disposed on the holder 7. The image sensor unit 1 is disposed on the holder 7 through a biasing member 13 such as a spring. Spacers 12 formed of a material having a low coefficient of friction are disposed on the lengthwise opposite end portions of the image sensor unit 1.

Also, as shown in FIG. 2B, the flat cable 9 which is a control signal path is disposed between the holder 7 and the image sensor unit 1. The flat cable 9 has one end C thereof connected to the control board 6, and has the other end thereof branching off on the holder 7, and one end S of the branch is connected to the image sensor unit 1, and the other end M thereof is connected to the motor 5.

It is desirable that end of the flat cable 9 which is connected to the control board 6 be disposed as proximately as possible to the guide shaft (the lengthwise direction of the scanning member 15) in order to make the influence of moment upon the guide shaft small.

Thus, the image sensor unit 1 scans parallel to the original mounting glass table and reads the image on an original while lightly abutting against the original mounting glass table through the spacers 12.

Figure 3:
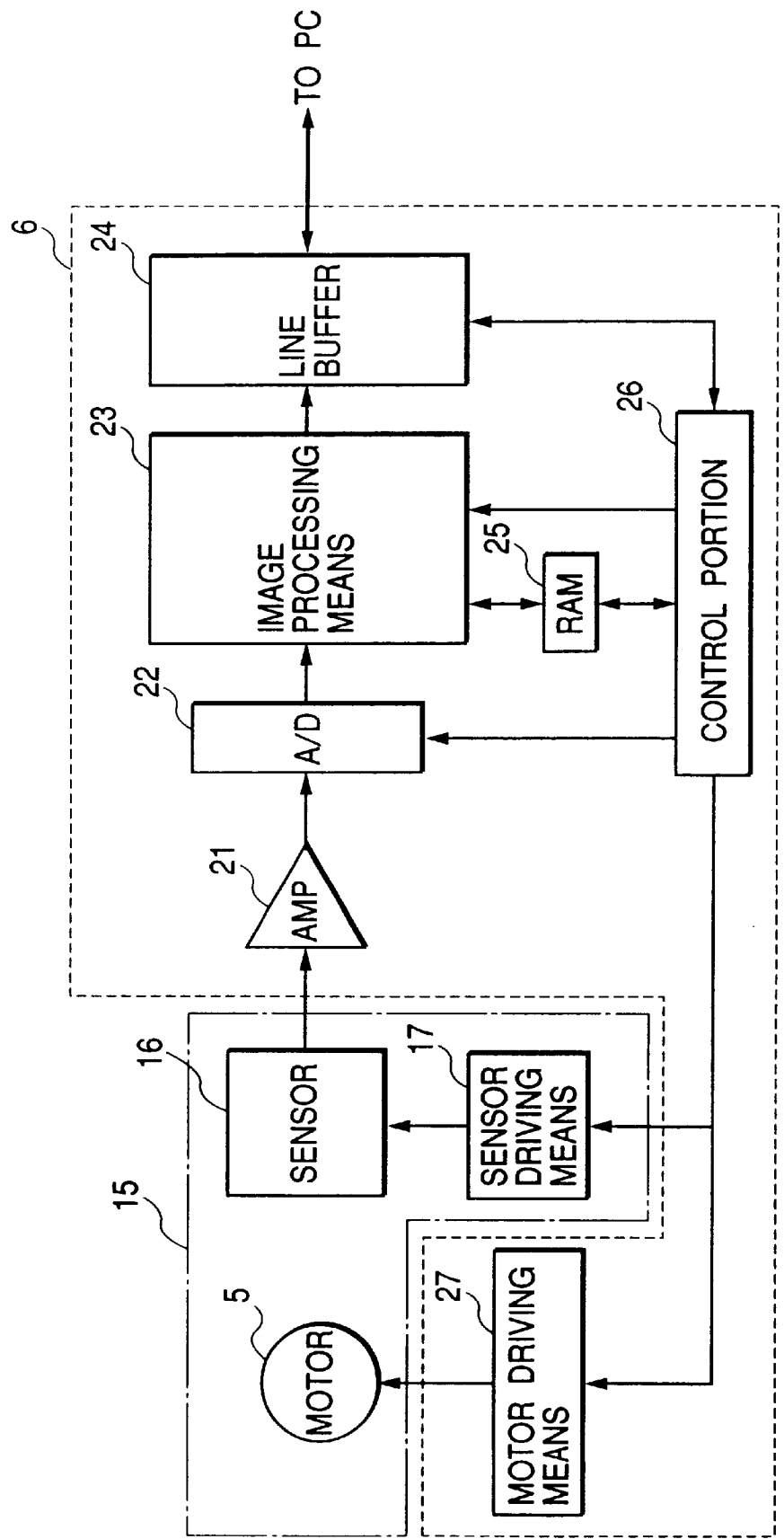
FIG. 3 is a functional block diagram showing the electrical construction of the image reading apparatus of FIG. 1.

FIG. 3 is a functional block diagram showing the electrical construction of the image reading apparatus SC1.

In FIG. 3, the portion encircled by a dot-an-dash line corresponds to the scanning member 15, and the portion encircled by a broken line corresponds to the control board 6. The operation of the image reading apparatus by each basic functional block is as follows. A control portion drives motor driving means 27 and sensor driving means 17. The sensor driving means 17 makes a sensor (image sensor) 16 execute the original reading operation. That is, the light sources (LED's of three colors), not shown, are caused to emit light toward the original while being changed over and turned on, and the reflected light from the original is imaged on a sensor element and is photoelectrically converted, thus accumulating charges. The sensor 16, the sensor driving means 17 and the LED's of three colors are an integral unit (corresponding to the image sensor unit). The motor 5 moves the scanning member 15 in the sub-scanning direction. An output signal from the sensor 16 is amplified by an amplifier 21, whereafter it is converted into a digital image signal by an A/D converter 22. The image signal digitized by the A/D converter 22 is subjected in image processing means 23 to image processing such as shading correction using shading data stored in an RAM 25, digital gain adjustment or digital black correction. Thereafter, the digital image signal is transmitted to an outside apparatus such as a personal computer (PC) through an interface housed in a line buffer 24. These are all effected by the control portion 26 controlling the respective functional blocks on the basis of the instructions from the driver means of the outside apparatus.

Figure 4:
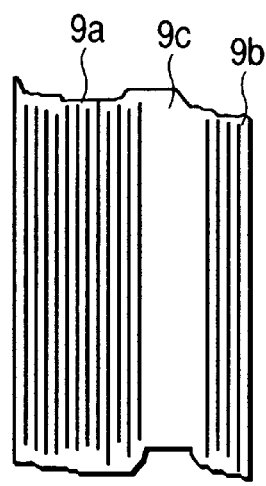
FIG. 4 is a plan view showing an example of the construction of a flat cable mounted on the image reading apparatus of FIG. 1.

FIG. 4 is a plan view partially showing an example of the construction of the flat cable 9.

In FIG. 4, a sensor control signal path 9a is the control signal path used for the image sensor unit 1, and a motor control signal path 9b is the control signal path used for the motor 5. A space portion 9c is provided between the two control signal paths. This is for preventing an evil such as the cross talk between the signals.

Figure 5:
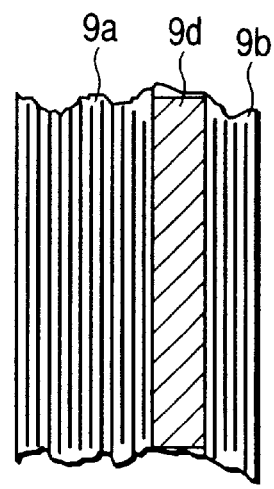
FIG. 5 is a plan view showing another example of the construction of the flat cable mounted on the image reading apparatus of FIG. 1.

FIG. 5 is a plan view partially showing another example of the construction of the flat cable 9. A sensor control signal path 9a is an electrical signal path for inputting and outputting a signal for drive-controlling the image sensor unit 1 to and from the same unit 1, and a motor control signal path 9b is an electrical signal path for inputting and outputting a signal for drive-controlling the motor 5 to and from the motor 5. A GND portion 9d is disposed between the two control signal paths. The GND portion 9d is connected to an earth line, and provides a greater effect to restrain the occurrence of the cross talk or the like between the signals.

The scanning member 15 and the scanning driving system thereof in the present embodiment constructed as described above do not require a complicated mechanism for indirectly transmitting motive power from a drive source provided outside the scanning member through a drive transmitting system such as a belt as in the prior art. Therefore, they are of course excellent in the carrying property, and the electric power necessary for the moving operation of the scanning member 15 is small and the scanning member can be driven by very low power consumption. Accordingly, the consumed power during the driving of the main body of the image reading apparatus can be restrained to 2.5 watt (W) or less, and the present embodiment is also designed such that the image reading apparatus SC1 performs the reading operation at the consumed power of 2.5 W or less. Saying in addition, the image reading apparatus of the present embodiment is provided with a well-known universal serial bus (USB) interface.

That is, this amount of power (2.5 watt) is an amount of power which can be supplied to peripheral equipment to which is connected a USB interface which is the universal interface of the personal computer (PC) which has rapidly been spreading in recent years, and the scanner in the present embodiment which is provided with the USB interface (I/F) does not require a power source unit as the conventional product does, and can perform its operation simply by being connected to the PC.

As described above, according to the image reading apparatus of the present embodiment, the control signal paths or the driving signal paths communicating with the image sensor unit 1, the drive source (motor 5) and the transmission 8 or the like disposed in the scanning member 15 are intensively provided in the single flat cable 9, whereby the complication of the wiring is alleviated and the integral provision of the drive source onto the scanning member can be done easily.

Also, outside the scanning member 15, the two control signal paths intensively provided in the single flat cable 9 are made to branch off in the scanning member (the upper surface of the bottom plate of the scanning member), and are wired along the gap between the image sensor unit and the bottom plate, whereby the containability of the flat cable 9 into the scanning member 15 is further improved.

While in the present embodiment, LED's of three colors are applied to the image sensor unit 1 as the light sources thereof, this is not restrictive.

Also, while in the present embodiment, the edge portion of a flat plate material is partly bent to provide a side plate, thereby forming the holder 7 comprising a bottom plate and a part side wall, and besides the image sensor unit 1, the motor 5 which is the drive source and the transmission 8 are juxtaposed on the upper surface of the bottom plate of the holder 7 to thereby construct the scanning member 15, what is constituted by a frame of a different shape from the holder 7, e.g. a box shape, or a shape formed by a plurality of bar material frames and using no plate material may be applied as the outer hull member. Besides this, the present invention can be applied to any other construction in which the photoelectric converting portion (image sensor) for the image and the drive source are provided integrally with each other or juxtaposed to thereby construct the scanning member.

Also, while the image reading apparatus of the present embodiment is provided with the USB interface, this is not restrictive, but the image reading apparatus may be provided with other universal interface which can supply small electric power in addition to the control signals. In this case, if the scanning member is designed to be operated by an amount of power which can be supplied through such a universal interface, an effect similar to that of the present embodiment can be achieved.

The present invention can also be applied to an image reading apparatus which is not provided with a universal interface such as a USB interface, and an effect corresponding to that of the present embodiment can be achieved.

Also, instead of the original mounting glass table used in the present embodiment, other light transmitting plate materials such as reinforced plastics can also be used.

Also, the biasing member 13 in the image reading apparatus of the present invention is not restricted to a spring, but may be any elastic member of rubber, resin or the like.

What is claimed is:

1. An image reading apparatus comprising:
    a scanning member movable along an original mounting table, said scanning member having
    a reading unit for reading the image of an original,
    a drive source for moving said scanning member, and
    a holder for holding said reading unit;
    a frame containing said scanning member and a fixed electric circuit board therein; and
    a cable for electrically connecting said scanning member and said electric circuit board together, said cable having
    a first electrical signal path connected to said reading unit, and
    a second electrical signal path connected to said drive source, wherein
    said cable is held between said reading unit and said holder.

2. An image reading apparatus according to claim 1, wherein said first electrical signal path and said second electrical signal path branch off from said cable on said scanning member, and are connected to said reading unit and said drive source, respectively.

3. An image reading apparatus according to claim 1, further comprising a guide member for guiding the movement of said scanning member, and wherein the non-branch portion of said cable is disposed near said guide member in the lengthwise direction of said scanning member.

4. An image reading apparatus according to claim 1, wherein an end portion of said cable, which is adjacent to said frame, is connected to a control board.

5. An image reading apparatus according to claim 1, wherein a gap is provided between said first electrical signal path and said second electrical signal path.

6. An image reading apparatus according to claim 5, wherein the gap is electrically grounded.

7. An image reading apparatus according to claim 1, wherein said cable is a flat cable.

8. An image reading apparatus according to claim 1, wherein said reading unit includes a light source for illuminating said original, an image sensor, and a lens for guiding light from said light source to said image sensor.

* * * * *